July 22, 1969 W. J. HANSON 3,457,011
TIME CONTROL MEANS FOR COPYING MACHINES
Filed Sept. 8, 1966 3 Sheets-Sheet 1
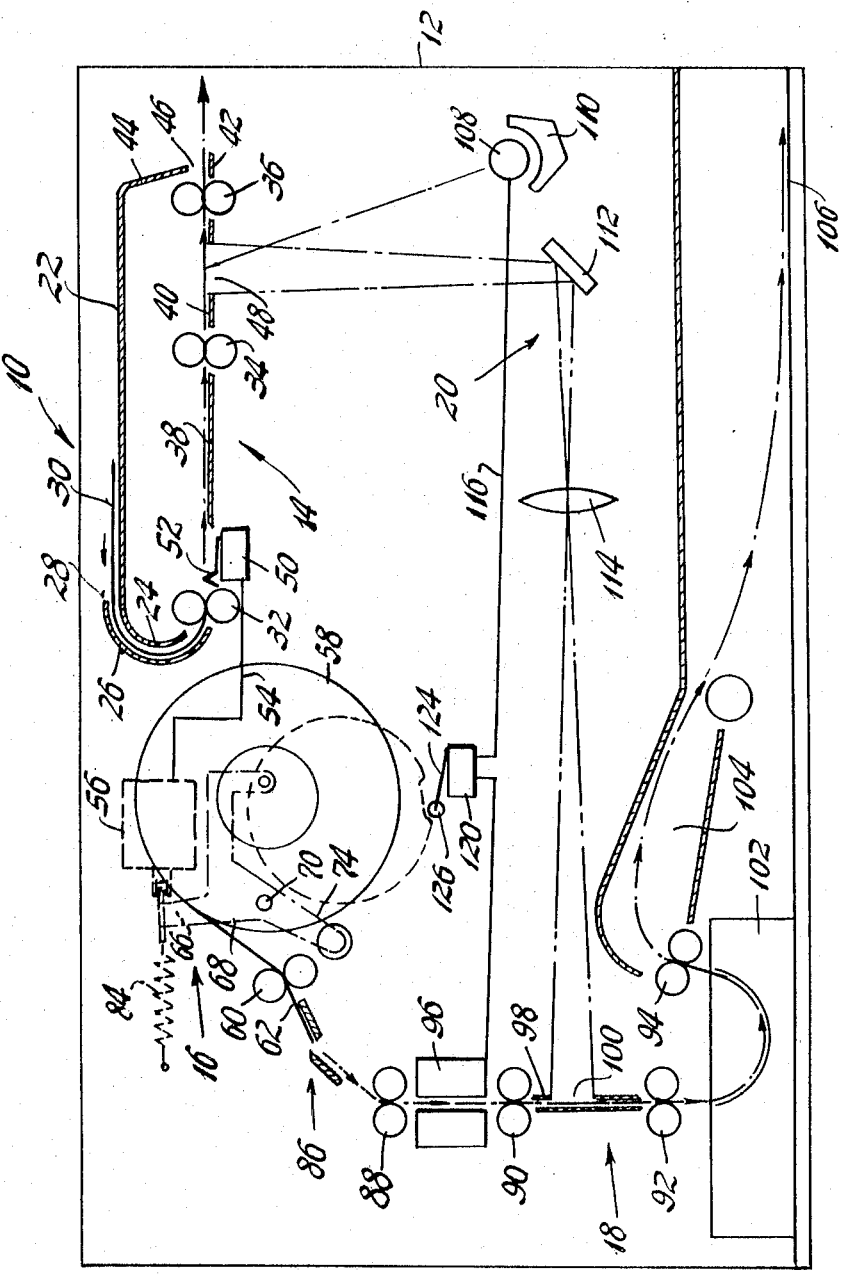
INVENTOR.
Walter J. Hanson
BY
Martin Wittstein
ATTORNEY

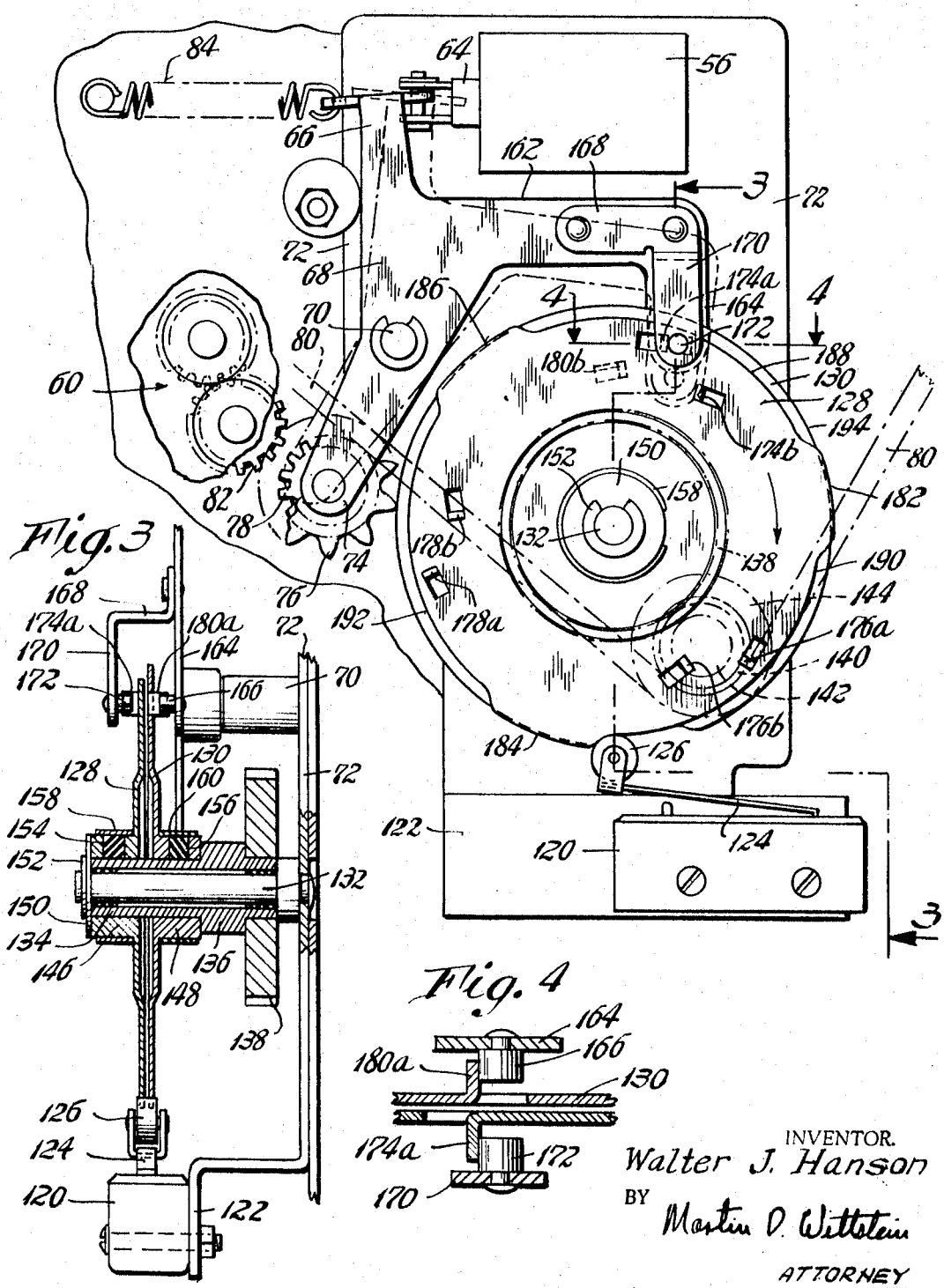

July 22, 1969        W. J. HANSON        3,457,011
TIME CONTROL MEANS FOR COPYING MACHINES
Filed Sept. 8, 1966        3 Sheets-Sheet 3
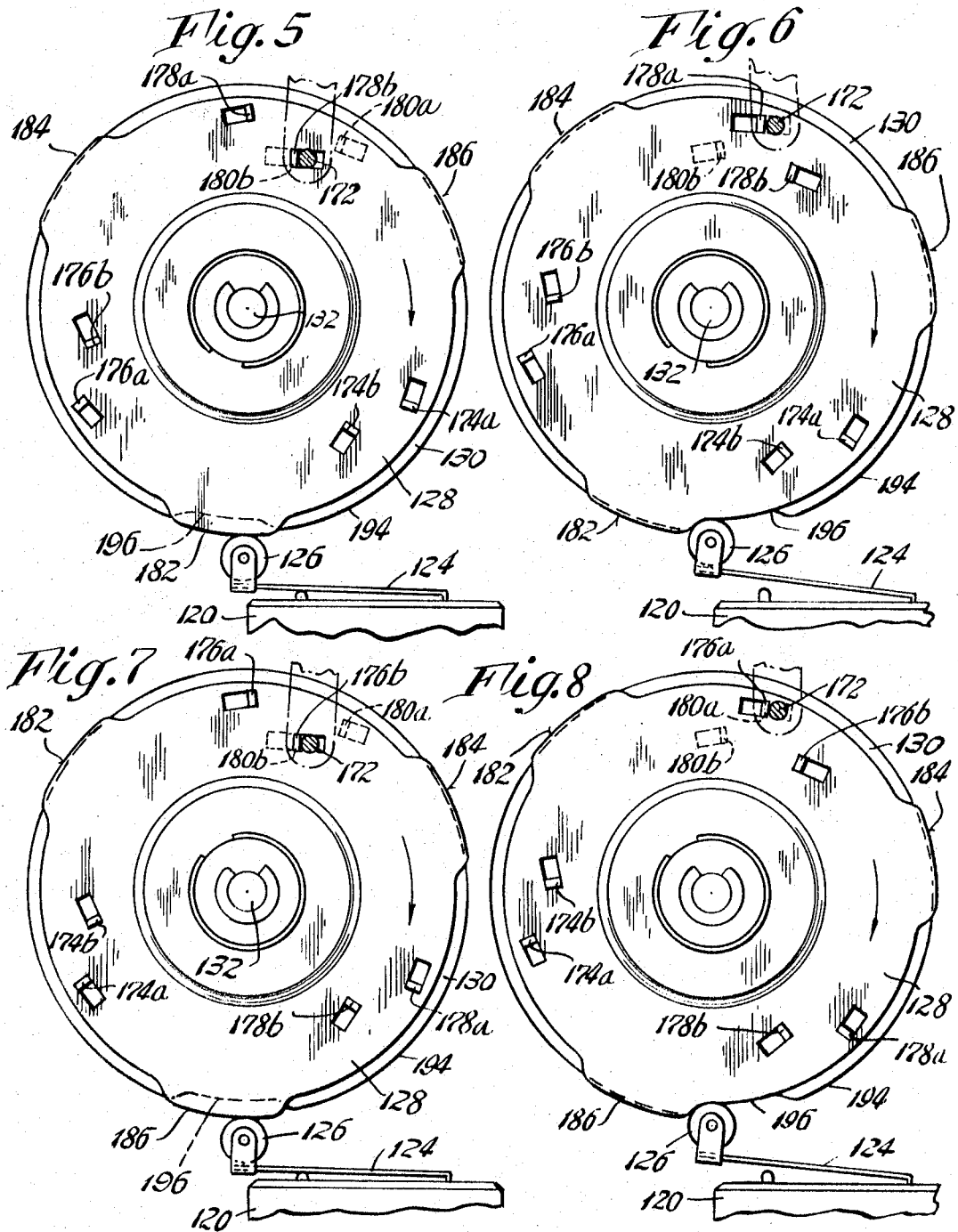
INVENTOR.
Walter J. Hanson
BY Martin D. Wittstein
ATTORNEY

3,457,011
TIME CONTROL MEANS FOR COPYING MACHINES

Walter J. Hanson, Old Greenwich, Conn., assignor to Pitney-Bowes, Inc., Stamford, Conn., a corporation of Delaware
Filed Sept. 8, 1966, Ser. No. 577,955
Int. Cl. G03b 27/70, 27/46
U.S. Cl. 355—51                                    9 Claims

ABSTRACT OF THE DISCLOSURE

An electrophotographic copying machine is disclosed in which an original document and copy paper are synchronously fed through spaced apart illuminating and exposing stations. A time control mechanism is provided for initiating and terminating energization of an illuminating lamp in timed coordination with initiation and termination of a copy paper feed mechanism, both under the control of a single lead and trail edge sensing means actuated by an original document so that the illuminating lamp is energized only for a minimum period of time and corresponding to the passage of the original document and copy paper through their respective illuminating and exposing stations.

---

This invention relates generally to improvements in copying machines. More particularly, it relates to improved means for controlling the period of energization of a source of radiation incident to making a copy from an original document.

Customarily in the copying art to which the present invention relates, an original document to be copied is inserted into the copying machine and is conveyed through a narrow imaging station wherein the document is continuously subjected to a suitable source of radiation, either heat or light. Simultaneously a reactive image receiving medium is conveyed through an exposing station in synchronism with movement of the original document, and an image of the indicia bearing portions of the original is produced on the image receiving medium. Thereafter, the original document may be discharged from the copying machine or recirculated therein for the purpose of making multiple copies. To either event, the image receiving medium is either discharged or is conveyed to a subsequent developing station depending upon the copying process involved, wherein the image is developed for subsequent transfer to copy paper or for use as the final copy, again depending upon the particular copying process being utilized.

It is essential to the production of complete copies of the original document that the radiation source be maintained energized at least during the time required for the original document to pass completely through the imaging station, that is, from the moment the leading edge of the original document enters the imaging station until the trailing edge of the document has moved out of the imaging station.

In order to assure energization of the radiation source for the paper time, the radiation source, in many prior art copying machines, has been connected in circuit with a main off-on switch for the machine, with the result that the radiation source is continuously energized while the machine is in operation, whether actually making copies or not. This is highly undesirable for the reasons, firstly, that the life of the radiation source is considerably shortened in terms of actual copying time of the machine, and, secondly, that considerable heat is created by the radiation source which is usually a high intensity lamp, and consequently special provision must be made for dissipating the heat.

Heat is a particularly troublesome problem in copying machines for many reasons. Firstly, excessive heat causes accelerated wear and tear on the machine operating components resulting in more frequent breakdown and repair or replacement of such parts. Also, it can, by expansion of metal parts, destroy the very delicate-adjustments made in the optical systems of certain types of photocopying machines so that indicia illuminated on an area of the original will not be exposed on a corresponding area of the copy paper, nor will a sharp, properly focused image be projected. Still further, and perhaps of major significance, is the fact that many of the solvents used in the developing processes are highly volatile and have relatively low flash points. Thus excessive heat presents a fire hazard. This situation is particularly acute in the case of an electrostatic copying machine where there is an electrostatic charger in the general vicinity of the developing means which is capable of producing ignition if the vapor from the developing solution is at a high enough temperature.

It is therefore apparent that the radiation source should be maintained energized for a minimum period of time in accordance with a particular copying process and the apparatus for carrying it out.

It has been proposed, therefore, to control energization of the source of radiation in accordance with movement of an original document through the machine by utilizing the document itself as a switch controller. Thus, in one prior art construction, a pair of switches in the radiation source or lamp circuit are disposed on opposite sides of the imaging station so that closure of either switch by the original document energizes the lamp. A major disadvantage of this arrangement is that paper actuated switches are a potential source of trouble in that they cause paper to become jammed in the feed path, particularly if the switch must be rugged enough to carry a high current. Sometimes a very thin original sheet does not have sufficient rigidity to actuate even a sensitive switch, thereby causing the paper to jam in the feed path.

It has been further proposed to utilize only one switch on the upstream side of the imaging station, with a timer interposed in the lamp circuit and operative upon disengagement of the switch by the trailing edge of the original document to maintatin the lamp circuit closed and the lamp energized until the trailing edge of the document has passed through the imaging station. This arrangement has been found to be satisfactory in those limited situations where an original document and a sheet of copy paper are manually superposed and simultaneously introduced into the copying machine, so that the need for energizing the radiation source is almost immediate upon the leading edge of the original sheet and copy paper entering their respective paths.

The present invention is directed to those copying machines in which copy paper is stored either in the form of cut sheets or as a web in roll form. In either case, the copying machine includes a feeding mechanism which either feeds a cut sheet from a supply receptacle, or feeds a predetermined length from the roll which is severed therefrom by an appropriate severing device. In order to keep the number of paper actuated switches to a minimum for the reasons explained above, it is desirable to control both the operation of the copy paper feeding means and the energization of the lamp or other radiation source from the same switch, and to do so in such a way that the lamp is energized substantially for the minimum period of time necessary to make a complete copy and such that successive original sheets may be rapidly fed into the copying machine with no interruption in the energization of the lamp at any time that an original sheet is passing through the imaging station.

Thus the present invention, in its broader aspects, provides for a copying machine having feeding means and feed paths for conveying an original sheet and a stored reactive image receiving medium through an imaging station and an exposing station respectively, and an energizable source of radiation under the control of a sensing means located in the original sheet path and spaced from the imaging station a distance corresponding to the distance between the exposing station and the leading edge of the image receiving medium, the combination therewith of control means for initiating movement of the image receiving medium, and for controlling energization and deenergization of the radiation source in time controlled relationship with movement of the original sheet toward and through the imaging station, the control means having means responsive to lead edge operation of the sensing means for actuating the means for initiating movement of the image receiving medium, and time delay means responsive to both lead and trial edge operations of the sensing means for respectively delaying energization of the radiation source until the original sheet and the image receiving medium have moved a predetermined distance toward their respective stations, and delaying deenergization of the radiation source until after the original sheet and the image receiving medium have passed through their respective stations, and means providing for independent control of the energization and deenergization of the radiation source so that a subsequent energization delay period may overlap a preceeding deenergization delay period.

Accordingly it is a principal object of the present invention to provide a time control means for a copying machine for maintaining a source radiation energized for a minimum period of time consistent with the copying process.

Another object of the present invention is to provide a time control means for a copying machine in which both energization and deenergization of a source of radiation is delayed in accordance with the position of an original sheet in relation to an imaging station.

It is another object of the present invention to provide a time control means for a copying machine by means of which the feeding of a stored image receiving medium and time controlled energization of a radiation source are under the control of a single sensing means operated by movement of an original sheet to be copied.

Another object of the present invention is to provide a time control means for a copying machine which prevents deenergization of the radiation source at any time that an original sheet is passing through the imaging station.

Still another object of the present invention is to provide a time control means for a copying machine which provides for independent control of the energization and deenergization respectively of the source of radiation so that the delay period for energization for a subsequent original sheet may overlap the delay period for deenergization for a preceding original sheet.

These and other objects and features of the present invention will be more fully appreciated from an understanding of the following detailed description of the present invention when considered in conjuction with the accompanying drawings in which:

FIGURE 1 is a schematic view of the principal operating features of an electrostatic copying machine with which the present invention is utilized;

FIGURE 2 is a side view of the copying paper feed mechanism and the time control means of the present invention;

FIGURE 3 is a sectional view through the timing cams and drive therefor taken on the line 3—3 of FIGURE 2;

FIGURE 4 is a sectional view of the abutment stops for the cams taken on the line 4—4 of FIGURE 2;

FIGURES 5–8 show four successive positions which the timing cams assume during cycles of operation of the time control means.

The time control means of the present invention is deemed to have general applicability to any type of copying machine in which a reactive image receiving medium, usually sensitized paper, is stored in the machine and is automatically fed to a location suitable for exposure to an image of the indicia bearing portions of an original document or sheet, the image receiving medium being fed in response to the entry of the original sheet into the copying machine. For purposes of illustration, however, and as disclosing the invention in its presently preferred form, it is shown and described in conjunction with an electrostatic copying machine wherein the image receiving medium is electrostatic photoconductive copy paper capable of being uniformly charged and selectively discharged in response to being struck by a light pattern to produce a latent image which is developed to render it visible. The copy paper is preferably in the form of a continuous web stored in a roll.

Referring to FIG. 1, the copying machine 10 comprises a housing 12 within which there is arranged an original document handling component 14, a copy paper storage and feed out component 16, and a copy paper processing component 18. In addition, an optical system 20 is provided for illuminating the original sheet and exposing the copy paper, as more fully described below.

The original document handling component 14 comprises a horizontal guide member 22 having a curved rear portion 24 which cooperates with a curved guide 26 to provide an entryway slot 28 for the original sheet 30. Feed roller pairs 32, 34 and 36 cooperate with suitable guide plates 38, 40, and 42, as well as guides 24 and 26 to define an original sheet path into, through and out of the copying machine, the guide 42 and a front portion 44 of the guide 22 providing an exit slot 46. The guide plate 40 is apertured as at 48 to define an illuminating station through which the sheet 30 is conveyed by the several roller pairs which are simultaneously driven by any suitable belt and pulley or chain and gear construction (not shown).

A switch 50 is suitably mounted in the original sheet path and has an actuator 52 which projects into the path of movement of the sheet 30 so that the leading edge of the sheet depresses the actuator 52 to close the switch and maintain the switch closed until the trailing edge of the sheet 30 passes and releases the actuator 52. The switch 50 is electrically connected, as indicated by the lead 54, to a solenoid 56 so that closure of the switch 50 by the sheet 30 energizes the solenoid 56 for a purpose to be hereinafter made clear.

The copy paper storage and feed out component 16 comprises a supply of copy paper 58 suitably mounted on portions of the machine frame and a feed roller pair 60 through which the free end 62 of the copy paper extends. Referring additionally to FIG. 2, the armature 64 of the solenoid 56 is connected to an upper arm 66 of a lever 68 which is pivotally mounted by a stud 70 on a plate 72 suitably secured to the machine frame. The lower arm 74 of the lever 68 rotatably carries a sprocket wheel 76 and a gear 78 fast with the sprocket 76, the latter being in continuous engagement with an endless chain 80 which is continuously driven by a motor (not shown). The lower roller of the roller pair 60 carries a gear 82 adapted to mesh with the gear 78. A spring 84 normally urges the lever 68 in a counter-clockwise direction to the position shown in solid lines to maintain the gears 78 and 82 out of engagement. However, when the solenoid is energized by closure of the switch 50 in the original sheet feed path, the armature 64 rocks the lever 68 in a clockwise direction about the stud 70 to the dotted line position thus engaging the gears 78 and 82 to cause rotation of the feed roller pair 60 and feed copy paper from the roll 58. The feeding continues until the switch 50 is opened to deenergize the solenoid and disengage the gears 78 and 82 under the action of the spring 84. The foregoing structure thus generally comprises a clutch means for feeding copy paper in response to operation of the original document actuated switch 50.

A knife mechanism, generally indicated by the numeral 86, is provided in the copy paper path and is actuated by suitable means to sever the copy paper web 62 at the instant that the solenoid 56 is deenergized to stop the feeding of the copy paper. The knife mechanism 86 is under independent control of a sensing element in the original sheet feed path which is not shown since it forms no part of the present invention, although it occupies the same position as does the switch 50. The details of the severing mechanism also are not pertinent to the present invention except to the extent that the location of the severing mechanism 86 determines the location of the leading edge of the copy paper in the copy paper path. The significance of this location is more fully explained below.

The copy paper processing component 18 comprises suitable guides and feed roller pairs 88, 90, 92 and 94 for conveying the copy paper through an electrostatic charging unit 96, an apertured guide 98 defining an exposing station 100, a developing tank 102 and a drying chamber 104. From the drying chamber 104 the finished copy sheet is delivered to a receiving station 106 for manual removal. It should be noted that all of the feed roller pairs shown, both in the original sheet feed path and in the copy paper feed path, are synchronously driven by the chain 80 shown in FIG. 2, with the exception of the feed roller pair 60 which is controlled by the above described clutch mechanism. Thus the original sheet 30 and a sheet of copy paper are conveyed in synchronism through their respective paths and stations 48 and 100.

The optical system 20 comprises a suitable source of radiation such as the high intensity lamp 108 and reflector 110 which illuminates the original sheet as it passes through the illuminating station 48. An image of the illuminated portion of the original sheet is reflected to a mirror 112 which in turn reflects the image to and through a focusing lens 114 whereupon the image is projected in sharp focus to the exposing station 100 where it is received by the light sensitive copy paper passing therethrough.

From the foregoing description, it can now be seen that the initiation of movement of the copy paper in the copy paper path is controlled by the movement of an original sheet in the original sheet path, and in order to maintain the number of paper actuated switches at a minimum, it is desirable to also control energization of the lamp 108 from the switch 50. However, in order for the leading edge of the original sheet 30 and a sheet of copy paper to arrive at their respective illuminating and exposing stations simultaneously, it is necessary to position the switch 50 as far in advance of the illuminating station 48 as the leading edge 62 of the copy paper is in advance of the exposing station 100 as determined by the location of the severing mechanism 86.

As indicated above, it is desirable to maintain the lamp 108 energized for as short a period of time as possible, this period being only the time during which an original sheet and the copy paper are actually passing through their respective stations. Accordingly, in order to control energization of the lamp 108 from the switch 50, a time delay is interposed in the lamp control means to delay the moment of energization of the lamp 108 until the leading edge of the original sheet and the copy paper reach their respective stations.

As a practical matter, and again to reduce the number of paper actuated switches in the original sheet or copy paper paths, the charging unit 96 is placed in the same circuit as the lamp 108 so that both are energized simultaneously. Accordingly the lamp control means is made effective to delay energization of the lamp 108 and charging unit 96 only until the leading edge of the copy paper has reached the charging unit 96, and the original sheet has traveled a corresponding distance.

Once the trailing edge of the original sheet 30 has passed the switch 50, it is necessary to maintain the lamp 108 energized until the trailing edges of the original sheet and the copy paper have passed completely through their respective stations 48 and 100. Accordingly another time delay is interposed in the lamp control means to delay the moment of deenergization of the lamp 108 for a length of time sufficient for the original sheet and copy paper to clear their respective stations.

As can be seen from FIG. 1, the distance between the illuminating station and the switch 50 is quite substantial in relation to the length of the original sheet 30, and it is therefore possible to insert a subsequent original sheet into the copying machine before the preceding original sheet has completely passed through the illuminating station. Provision is therefore made, in addition to the above-mentioned time delays, for independent control of the time delays with the control mechanim whereby the lamp 108 energized until the trailing edges of the original sheet and copy sheet have moved the prescribed distance toward their respective paths regardless of whether or not the delay period for deenergization of the lamp from a preceding original sheet has expired. This is to assure that there is no momentary deenergization of the lamp 108 while a succeeding original is passing through the illuminating station, as there would be if reenergization of the lamp 108 by a succeeding original had to await the expiration of the preceding deenergization delay period and the operator inserted a new original sheet prior to the expiration of such period.

One embodiment of a control means for accomplishing the foregoing operational features will now be described. The control means comprises broadly the copy paper feeding clutch mechanism described including the solenoid 56, the rocking lever 68, and the engageable driving mechanism for the roller pair 60. In addition the control means comprises first and second time delay means under the control of the switch 50, and means for causing independent action of the time delay means, all for appropriately energizing and deenergizing a circuit to the lamp 108 and the charging unit 96.

More specifically, referring to FIGS. 1 and 2, the lamp 108 and charging unit 96 are each connected by leads 116 and 118 respectively to a switch 120, the latter being mounted on a bracket 122 and having an actuating finger 124 carrying a roller 126. The roller 126 and hence the switch 120 are under the control of a pair of cams 128 and 130 which are coaxially mounted for independent rotation. An elongated stationary stud 132 is secured to the plate 72, the stud 132 rotatably carrying a sleeve 134 thereon. The sleeve 134 has a spacer portion 136 and is fixedly secured to a gear 138 which meshes with a gear 140 (FIG. 2) carried by a shaft 142, the latter also carrying a sprocket wheel 144 which is engaged with the continuously driven chain 80. Thus when the machine is in operation, the chain 80, sprocket 144, gears 140 and 138 and sleeve 134 are continuously rotating.

The cams 128 and 130 each have radially innermost out turned flanges 146 and 148 respectively which are loosely received on the sleeve 134; the cams are retained on the sleeve by a suitable washer 150 and snap ring 152. Each flange 146 and 148 is provided with an aperture 154 and 156 respectively, each of which receives a plug of resilient compressible material. A pair of annular springs 158 and 160 surround each cam flange 146 and 148 respectively so as to compress each resilient plug and effect a frictional drive between the sleeve 134 and the cams 128 and 130. Thus, when the cams are released for rotation by means described below, the sleeve 134 exerts driving force on each resilient plug which in turn exerts driving force on its respective cam flange. Both cams are thus driven in synchronism but independently of each other from a common source of power, i.e. the sleeve 134.

The amount of rotation of the cams 128 and 130 for each copy to be made is controlled by an escapement mechanism preferably in the form of a releaseable latch device operable on each cam to either restrain or arrest motion of the cams or to permit a certain amount of rotation of the cams in accordance with the position of a plurality of abutment stops on the cams with which the latch engages, the abutment stops in turn being located in accordance with the position and extent of lobed surface portions on each cam, as more clearly seen hereinafter. Referring to FIGS. 2 and 3, the lever 68 is provided with a third horizontally extending arm 162 which terminates in a downwardly extending projection 164, the projection 164 carrying a pin 166. A bracket 168 is secured to the arm 162 and has a downwardly extending projection 170 disposed in spaced parallel relation to the projection 164, the projection 170 also carrying a pin 172. The pins 166 and 172 are in axial alignment but spaced apart sufficiently so that the cams 128 and 130 can fit therebetween, as best seen in FIG. 3. It will be seen that when the lever 68 is rocked by the solenoid 56 and the spring 84 between the dotted and solid lines respectively, the pins 166 and 172 are shifted between the dotted and solid line positions shown in FIG. 2.

Each cam 128 and 130 is provided with a plurality of abutment stops in the form of struck out fingers, the abutments being placed radially so as to be engaged by the pins 166 and 172 in either of their above described positions whereby they control the rotational movement of the cams both upon energization and deenergization of the solenoid 56. Specifically, and referring to FIG. 2, the cam 128 is provided with three sets of abutment stops 174, 176 and 178, each set having a radially outer abutment indicated by the suffix a and a radially inner abutment indicated by the suffix b. The inner and outer abutments of each set are angularly separated by an arc of approximately 15°. The cam 130 is provided with only one set of abutments 180, the outer abutment 180a being aligned with the abutment 174a as seen in FIGS. 3 and 4, the inner abutment 180b being shown in FIG. 2. These abutments are also angularly separated by an arc of approximately 15°. It will now be seen that each cam will rotate in synchronism but independently when the latch device moves and disengages the pins from their respective abutment stops, and the cam will be arrested when the next abutment stop in each cam strikes a pin. The specific operating cycles of each cam will be more fully explained below.

In order to operate the switch 120 to control the lamp 108 and the charging unit 96 in accordance with movement of an original document, the cams 128 and 130 are provided with lobes and recesses which are correlated both as to position and extent with the desired amount of time delay on both energization and deenergization of the lamp circuit as controlled by the switch 120. Thus, cam 128 has three lobes, 182, 184 and 186 each covering an arc of approximately 15°, and three recesses 188, 190 and 192 each covering an arc of approximately 105°. Cam 130 has one lobe 194 covering an arc of approximately 345° and one recess 196 covering an arc of approximately 15°.

Having now fully described the structure of the time control mechanism, it remains to describe a complete cycle of operation thereof. For the purpose of facilitating an understanding of this operation, it will be divided into two possible modes of operation of the copying machine, i.e., single copy and successive non-overlapping copy operating on one hand and successive overlapping copy operation on the other hand.

SUCCESSIVE NON-OVERLAPPING COPY
OPERATION—FIGS. 1, 2, 5 AND 6

An original sheet 30 is inserted into the entrance slot 28 and pushed around the guides 24 and 26 and into the bite of roller pair 32 whereupon the sheet becomes machine controlled. When the leading edge of the sheet 30 closes the switch 50, the solenoid 56 is energized and the lever 68 is rocked in a clockwise direction to the dotted line position of FIG. 2. Thus the already rotating gear 78 is caused to mesh with the gear 82 to commence feed of the copy paper by the roller pair 60.

Simultaneously, the pins 172 and 166 are disengaged from the abutments 174a and 180a of cams 128 and 130 respectively and both cams begin to rotate in synchronism from their positions shown in FIG. 2 under the influence of the already rotating sleeve 134. The cam 130 rotates approximately 15° and is arrested by engagement of the pin 166 with the inner abutment 180b, as seen in FIG. 5, with its recess 196 still over the roller 126 of the switch 120. At this point of rotation (15° for both cams) the recess 190 of the cam 128 is still over the roller 126 so that the switch 120 is still open, but the cam 128 continues to rotate independently of the cam 130 until it has rotated 90° *from* its starting (FIG. 2) position at which time the lead end of the lobe 182 depresses the roller 126 and closes the switch 120, thereby energizing the lamp 108 and the charging unit 96. During this 90° of rotation of the cam 128, the leading edge of the copy paper 62 has advanced from its initial position at the severing mechanism to the entrance of the charging unit 96, and the original sheet 30 has advanced a corresponding distance in the original sheet feed path toward the illuminating station 48. The cam 128 continues to rotate for another 15°, with the lobe 182 holding the roller 126 depressed, and finally is arrested after rotating 105° by engagement of the inner abutment 178b with the pin 172. This is the position of the cams 128 and 130 as shown in FIG. 5 with the switch 120 on and the lamp 108 and charging unit 96 both energized.

Thus, by operation of the cam 128, the energization of the lamp 108 and charging unit 96 has been delayed after the commencement of feeding of the copy paper until the leading edge of the copy paper has reached the charging unit and the original document has traveled a corresponding distance.

The original sheet 30 and the copy paper 62 continue to travel toward and through their respective stations 48 and 100 while the copy is being made until the trailing edge of the original sheet 30 passes the switch actuator 52, at which time the switch 50 is opened and the solenoid 56 is deenergized. The spring 84 now rocks the lever 68 in a counter-clockwise direction back to the solid line position of FIG. 2. Simultaneously, the gears 78 and 82 are disengaged to stop the feeding of copy paper, and the severing mechanism 86 is actuated by means not disclosed since as indicated above, the details of control of the severing mechanism for severing the web of copy paper forms no part of the present invention.

When the lever 68 is rocked back to its initial position by the spring 84, the pins 166 and 172 are raised to their upper solid line positions shown in FIG. 2, again freeing the cams 128 and 130 for synchronous rotation by the sleeve 134. The cam 128, which delayed energization of the lamp 108 and the charging unit 96, now rotates 15° and stops by virtue of engagement of the abutment 178a with the pin 172 and with the trail end of the lobe 182 just beyond the roller 126, the position of cam 128 shown in FIG. 6. However, since both cams 128 and 130 are rotating, it will be seen from FIG. 5 that the lead end of the lobe 194 of cam 130 engages the roller 126 just before the trail end of the lobe 182 of the cam 128 leaves the roller 126, so that the roller 126 is now maintained depressed by the lobe 194 of the cam 130. The cam 130 continues to rotate independently of the cam 128, and traverses an arc of 345° (15° with cam 128 and 330° independently of cam 128) until the abutment 180a of the cam 130 is again engaged by the pin 166. At this point the trail end of the lobe 194 has just passed the roller 126 and the latter has entered the recess 196 thereby opening the switch 120. The parts are now in the positions shown in FIG. 6.

During the time required for the cam 130 to rotate the 345° while maintaining the roller 126 depressed, the trailing end of the original sheet 30 and the severed sheet of copy paper have passed through their respective stations 48 and 100 and the entire original sheet has been fully copied. Opening of the switch 120 thereupon deenergizes the lamp 108 and the charging unit 96. The original sheet 30 is discharged through the exit slot 46, while the sheet of exposed copy paper continues through the developing tank 102 and the drying chamber 104 to be discharged into the copy receiving station 106.

From the foregoing description, it will be seen that, upon lead edge operation of the switch 50 by the original sheet 30, the cam 128, during its initial rotation of 90°, delays the energization of the lamp 108 and the charging unit 96, while the cam 130, during its 15° of rotation is merely set for later operation. Further, upon trail edge operation of the switch 50, by the original sheet 30, the cam 128 rotates 15° to an inactive position in which it is merely set for the next cycle of operation, but the cam 130 now takes control for 345° of rotation of delay deenergization of the lamp and charging unit until the original sheet and the copy paper sheet have completely passed through their respective illuminating and exposing stations. Thus the cam 128 rotates 120° for each operation cycle of the control mechanism, whereas the cam 130 rotates 360° for each operation cycle thereof.

It should be observed that with the above described construction, the energization delay period of 90° of rotation of cam 128 is slightly over one-quarter of the deenergization delay period of 345° of rotation of cam 130, the reason for this being, as seen in FIG. 1, that the distance from the severing mechanism 86 to the charging unit 96 is much less than the distance from the switch actuator 52 to the outlet end of the illuminating station 48, these distances representing respectively the energization delay and the deenergization delay controlled by the cams 128 and 130. These delay periods can, of course, be varied by varying the speed of rotation of the driving sleeve 134.

In addition, although the two cams are synchronously driven when they are both rotating in the embodiment of the invention disclosed herein, it is within the scope of the invention to provide one of the cams with differential gearing so that they are simultaneously driven at different speeds. Thus different delay times may be achieved with the same lobe and abutment stop construction on both cams.

SUCCESSIVE OVERLAPPING COPY OPERATION—
FIGS. 1, 2, 5, 7 AND 8

The above sequence of operation is repeated each time a new original is inserted into the copy machine. However, as will now be seen, it is not necessary for the operator to wait until one original sheet has been ejected through the exit slot 46 before inserting another original sheet. Because of the means providing for independent operation of the two timing cams, it is possible to feed original documents into the machine in close succession, so that the commencement of an energization delay operation of the cam 128 for a subsequent original document overlaps the deenergization delay operation of the cam 130 from a preceding original document. The result of this feature of the invention is that the copying time required for a multi-page document is a small fraction of that which would be required if the control means could operate properly on only one original sheet in the copying machine at a time.

Thus, upon insertion of the first original sheet 30, and commencing with the cams in the positions shown in FIG. 2, the leading edge of the original sheet 30 closes the switch 50 to energize the solenoid 56 and rock the lever 58 to its dotted line position in FIG. 2, thereby commencing the feeding of copy paper and freeing the cams 128 and 130 for synchronous rotation. The cams rotate to the positions shown in FIG. 5 to energize the lamp 108 and the charging unit 96 as described above.

As soon as the trailing edge of the original sheet 30 leaves the switch 50, thereby deenergizing the solenoid 56 to stop the copy paper feed to actuate the severing mechanism 86 and to again free the cams 128 and 130 for rotation, the copying machine is then conditioned to accept a subsequent original sheet even though the control mechanism has not completed its cycle of operation of the preceding original sheet.

As a practical matter, the 15° of rotation of the cam 128 from the FIG. 5 position to the FIG. 6 position is of such short duration, about fifteen-hundredths of a second, that the cam 128 will probably reach the FIG. 6 inactive position and be at least momentarily arrested there before the leading edge of the subsequent original sheet can close the switch 50 to commence a second cycle of operation of the cam 128.

If a subsequent original sheet is inserted almost immediately after the trailing edge of the preceding original sheet has opened the switch 50, the leading edge of the subsequent original sheet closes the switch 50 to reenergize the solenoid 56 and restart the feeding of copy paper. Simultaneously, the pins 166 and 172 are again moved to their lower position as shown in FIG. 7 so as to free the cam 128 for synchronous rotation with the cam 130 to an active position in which the lobe 186 becomes engaged with the roller 126. However, while the lobe 186 of cam 128 is moving from the FIG. 5 position (or the FIG. 6 position depending upon operator delay in inserting the subsequent original) to the FIG. 7 position, the cam 130 is also rotating and its lobe 194 is holding the roller 126 depressed, so that the lamp 108 and charging unit 96 are maintained energized. The cam 128 is arrested in the FIG. 7 position by engagement of the abutment 176b with the pin 172, at which time the cam 128 has rotated 105° and cam 130 has rotated slightly more than 105° depending on the length of time that the cam 128 was momentarily arrested in the FIG. 6 position. Therefore, both the lobe 186 of cam 128 and the lobe 194 of cam 130 are engaged with the roller 126.

The cam 130 continues to rotate for the balance of its complete revolution while the trailing edge of the preceding original sheet passes through the illuminating station 48, while at the same time the leading edge of the subsequent original sheet is approaching the illuminating station. The cam 130 actually rotates a total of 360° from the position shown in FIG. 5 or 375° from the normal home position shown in FIG. 6 for the reason that the solenoid 56 is deactivated by the trailing edge of the preceding original sheet and almost immediately reactivated by the leading edge of the subsequent original sheet before the cam 130 has reached its home position; therefore it continues to rotate until the abutment 180b is engaged by the pin 166, in which position the recess 196 is adjacent the roller 126, as shown in FIG. 7. At this time the delay period for deenergization of the lamp 108 and charging unit 96 has expired, but the cam 128 now maintains the lamp and charging unit energized so long as the switch 50 is held closed by the subsequent original sheet passing over the switch actuator 52.

When the trailing edge of the latter passes the switch 50, and assuming that no further original sheets are inserted into the machine for copying, the switch 50 is opened thereby deenergizing the solenoid 56 and raising the pins 166 and 172 to their upper position as seen in FIG. 8. This again releases the cams 128 and 130 for synchronous rotation, the cam 128 rotating 15° to move the lobe 186 away from the roller 126, the cam 130 again rotating 345° to maintain the lamp 108 and the charging unit 96 energized until the trailing edge of the subsequent original and the sheet of copy paper have cleared their respective stations. Upon completion of this rotation, the cams will then assume the positions shown in FIG. 8.

The foregoing discussion presumes that the operation is feeding original documents into the copying machine in such rapid succession that cam 128 is caused to position one of its three lobes 182, 184 or 186 in engagement with the roller 126 before cam 130 can complete a time delay revolution, with the result that the lamp 108 and charging unit 96 are both continuously energized until the trailing edge of the last original sheet passes through the illuminating station. The construction and arrangement of the cams 128 and 130 is such, however, that if the operator delays in inserting one of the original sheets, the lamp 108 and the charging unit 96 will be momentarily deenergized.

Thus, if a subsequent original sheet is inserted into the copying machine after the deenergization delay cam 130 has rotated sufficiently far that it has less than 90° to rotate before reaching its home or inactive position, it will reach this position before the energization delay cam 128 reaches an active position. For example, if the leading edge of a subsequent original sheet closes the switch 50 at a time when the cam 130 has only 45° left to rotate before reaching its inactive position, the lamp 108 and the charging unit will be deenergized for approximately one-half of the normal energization delay period of the cam 128. This is so for the reason that the cam 128 must rotate approximately 90° after closure of the switch 50 before it is effective to energize the lamp 108 and the charging unit 96. It is therefore apparent that the construction and operation of the cams 128 and 130 is such that they maintain the lamp 108 and the charging unit 96 energized for the minimum period of time necessary to make copies not only in relation to the passage of a single original sheet through the copying machine at isolated times but also in relation to the passage of a plurality of original sheets in rapid succession. It is also now apparent that the construction and arrangement of parts is such that the lamp 108 cannot be deenergized while any portion of an original sheet is passing through the illuminating station 48 regardless of whether a single copy is being made or rapidly successive copies are being made.

It is apparent from the foregoing that there is provided a time control means for a copying machine which avoids the disadvantages of prior art constructions and achieves the foregoing objects. It is to be understood that present invention is not limited to the embodiment described above and shown in the accompanying drawings, which is merely illustrative of the best mode presently contemplated for carrying out the principles of the invention and is susceptible to change in size, shape, detail and arrangement of parts, but rather is intended to include all such modifications and variations thereof as may be deemed to be within the scope of the appended claims.

What is claimed is:

1. In a copying machine comprising:
   (A) means including guiding and feeding means defining an original sheet path and an image receiving medium path having respectively an imaging station and an exposing station,
   (B) means, including a reactive image receiving medium normally stored in the copying machine with a leading edge thereof disposed in spaced relation with said exposing station, for delivering said image receiving medium to said image receiving medium path,
   (C) an energizable source of radiation suitable for reproducing on said image receiving medium the indicia bearing portions of an original sheet as the latter and said image receiving medium move through their respective stations, and
   (D) sensing means located in said original sheet path in spaced relation with said imaging station corresponding to said spaced relation of the leading edge of the image receiving medium and the exposing station and operable to sense the passage of the leading and trailing edge respectively of an original sheet,
   (E) the combination therewith of control means for initiating movement of said image receiving medium to said image receiving medium path and for controlling energization and deenergization of said source of radiation in time controlled relationship with movement of an original sheet in said original sheet path, said control means comprising
      (1) means responsive to lead edge operation of said sensing means for actuating said image receiving medium delivering means,
      (2) time delay means responsive to lead and trail edge operation of said sensing means for respectively energizing said radiation source a predetermined time after a lead edge operation of said sensing means and for deenergizing said radiation source a predetermined time after a trail edge operation of said sensing means, and
      (3) means providing for independent control of said time delay means for the energization and deenergization of said radiation source whereby a subsequent energization delay period may overlap a preceeding deenergization delay period.

2. In a copying machine comprising:
   (A) means including guiding and feeding means defining an original sheet path and a copy paper path having respectively an illuminating station and an exposing station,
   (B) means, including a supply of light sensitive copy paper normally stored in the copying machine with a leading edge thereof disposed in spaced relation with said exposing station, for delivering copy paper to said copy paper path,
   (C) an energizable light source for optically reproducing on said copy paper the indicia bearing portions of an original sheet as the latter and said copy paper move through their respective station, and
   (D) sensing means located in said original sheet path in spaced relation with said illuminating station corresponding to said spaced relation of the leading edge of said copy paper and the exposing station and operable to sense the passage of the leading and trailing edges respectively of an original sheet,
   (E) the combination therewith of control means for initiating movement of said copy paper to said copy paper path and for controlling energization and deenergization of said light source in time controlled relationship with movement of an original sheet in said original sheet path, said control means comprising:
      (1) means responsive to lead edge operation of said sensing means for actuating said copy paper delivering means,
      (2) first time delay means responsive to lead edge operation of said sensing means for delaying energization of said light source until the original sheet and said copy paper have advanced a predetermined distance,
      (3) second time delay means responsive to trail edge operation of said sensing means for delaying deenergization of said light source until the original sheet and said copy paper have advanced another predetermined distance, and
      (4) means providing for independent operation of said first and second time delay means whereby said first time delay is operable in response to lead edge operation of said sensing means by a subsequent original sheet before the completion of operation of said second time delay means in response to trail edge operation of said sensing means by a preceding original sheet.

3. A combination according to claim 2 wherein said control means includes switch means controlling an electric circuit to said light source, and said first and second time delay means comprises first and second movable elements having respectively means for closing and opening said switch means after a predetermined amount of movement of said elements, and said means providing for independent operation of said first and second time delay means comprises means for independently controlling the movement of said movable elements in timed relationship with said lead and trail edge operations of said sensing means such that said first element moves to close said switch a predetermined time after said lead edge operation of said sensing means and said second element moves to open said switch means a predetermined time after said trailing edge operation of said sensing means.

4. A combination according to claim 2 wherein said control means includes switch means controlling an electric circuit to said light source, and said first and second time delay means each comprises a cam having at least one lobed surface portion engageable with said switch means for closing said switch means, and said means providing for independent operation of said first and second time delay means comprises means for independently intermittently rotating said cams in timed relationship with said lead and trail edge operation of said sensing means such that, upon lead edge operation of said sensing means, the lobed portion of one cam engages said switch means only after a predetermined amount of rotation of said one cam, and upon trail edge operation of said sensing means, the lobed portion of the other cam engages said switch means before the lobed portion of said one cam leaves said switch means and remains engaged with said switch means for a predetermined amount of rotation of said other cam.

5. A combination according to claim 2 wherein said control means includes switch means controlling an electric circuit to said light source, said first time delay means comprises a cam having at least one relatively short lobed surface portion for closing said switch means only after a predetermined amount of rotation of said cam, said second time delay means comprises another cam having a relatively long lobed surface portion for maintaining said switch means closed for a predetermined amount of rotation of said other cam, and said means providing for independent operation of said first and second time delay means comprises means for intermittently rotating said cams synchronously but independently of each other in timed relation with said lead and trail edge operation of said sensing means such that, upon lead edge operation of said sensing means, said first cam rotates until its lobed portion engages and closes said switch means, and upon trail edge operation of said sensing means, said first and second cams rotate with the lobed portion of said second cam engaging said switch means before the lobed portion of said first cam is disengaged from said switch means, and the lobed portion of said second cam remaining in engagement with said switch means for a predetermined amount of rotation of said second cam.

6. A combination according to claim 5 wherein said means for intermittently rotating said cams synchronously but independently of each other comprises means continuously urging said cams in one direction of rotation, and an escapement mechanism coacting with said cams and responsive to successive lead and trail edge operations of said sensing means for permitting said cams to rotate a predetermined amount in accordance with the location and extent of the lobed surface portions of each cam.

7. A combination according to claim 5 wherein said means for intermittently rotating said cams synchronously but independently of each other comprises a continuously operable drive element carrying said first and second cams in independent frictional driving relationship therewith, and movable latch means alternately operable on said cams in different positions of said latch means to permit a limited amount of independent rotation of each cam, and means for operating said latch means in response to successive lead and trail edge operations of said sensing means.

8. A combination according to claim 5 wherein said means for intermittently rotating said cams synchronously but independently of each other comprises a continuously operable drive element carrying said first and second cams in frictional driving relationship therewith, each of said cams having at least one pair of abutment members, the abutment members of each pair being radially spaced from each other and angularly spaced from each other corresponding to the amount of rotation desired of each cam upon said lead and trail operation of said sensing means, a rotatably mounted lever, means for rocking said lever in one direction in response to lead edge operation of said sensing means and for rocking said lever in the opposite direction in response to trail edge operation of said sensing means, a pair of pins carried by said lever in position to be shifted radially of said cams a distance corresponding to the radial distance between said abutment stops whereby when said lever is rocked, said pins are disengaged from one of the abutment members and said cams rotate until a radially different abutment member engages said pins.

9. A combination according to claim 8 wherein said first cam is provided with a plurality of relatively short lobed portions and a corresponding number of pairs of said abutment members and said second cam is provided with a single relatively long lobed portion and a single pair of abutment members whereby the delay period of energization of said light source is shorter than the delay period of deenergization of said light source in response to successive lead and trail edge operations of said sensing means.

References Cited

UNITED STATES PATENTS 3,289,532  12/1966  Baumgarten et al. _____ 88—24

NORTON ANSHER, Primary Examiner

R. A. WINTERCORN, Assistant Examiner

U.S. Cl. X.R.

226—24